R. P. KRUSE.
END GATE FASTENER.
APPLICATION FILED OCT. 13, 1915.
1,205,550.
Patented Nov. 21, 1916.
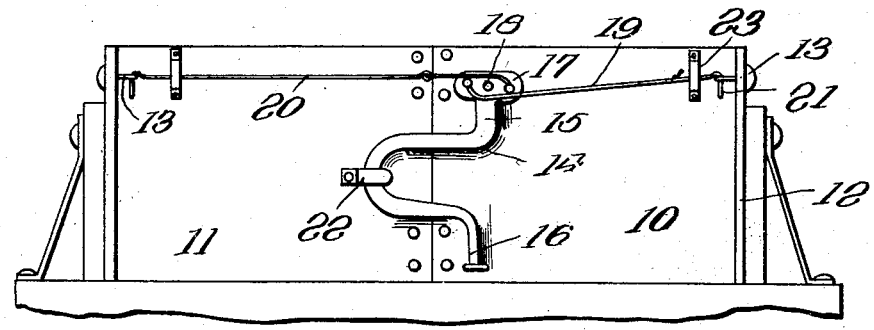
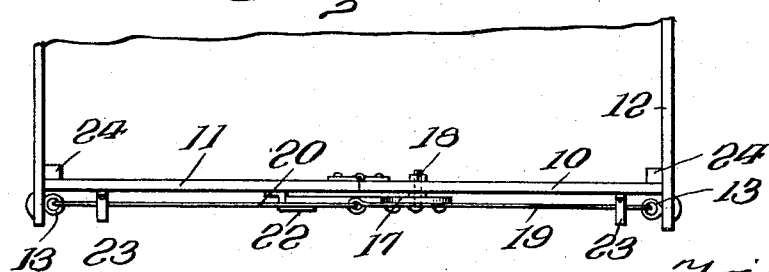
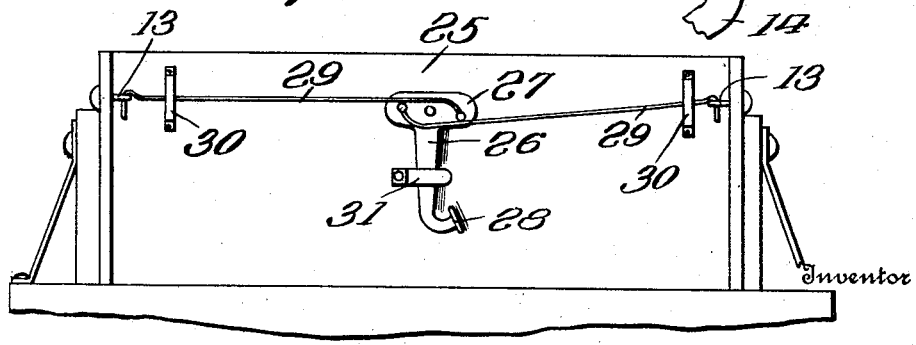
Inventor
R. P. Kruse.
By
Attorneys.

UNITED STATES PATENT OFFICE.

ROBERT P. KRUSE, OF RUSHVILLE, ILLINOIS.

END-GATE FASTENER.

1,205,550. Specification of Letters Patent. Patented Nov. 21, 1916.

Application filed October 13, 1915. Serial No. 55,669.

*To all whom it may concern:*

Be it known that I, ROBERT P. KRUSE, a citizen of the United States, residing at Rushville, in the county of Schuyler and State of Illinois, have invented certain new and useful Improvements in End-Gate Fasteners, of which the following is a specification.

This invention contemplates an improved end gate fastener for wagons or other vehicles and has as its primary object to provide a device of this character so constructed that it may be readily operated to lock the end gate in position or may be operated with equal facility to free the end gate.

The invention has as a further object to provide a device of this character especially adapted for use in connection with end gates formed of hingedly connected sections and so formed that when the end gate is locked in position, the device will operate to hold the said sections in operative position or in alinement. And a still further object of the invention is to provide a device of this character so constructed that pressure tending to separate the sides of the wagon and free the end gate will correspondingly urge the device into more securely locked position tending to hold the end gate fixed.

Other and incidental objects will appear as the description proceeds and in the drawings wherein I have illustrated the preferred embodiment of the invention and wherein similar reference characters designate corresponding parts throughout the several views, Figure 1 is an end elevation showing my improved fastener applied to an end gate formed of hingedly connected sections, the portion of the wagon body shown being conventionally illustrated. Fig. 2 is a top plan view more particularly showing the mounting of the several elements of the fastener, Fig. 3 is a fragmentary elevation showing the manner in which the rods of the fastener are connected to the locking lever thereof, and Fig. 4 is a view similar to Fig. 1 showing a slightly modified form of fastener especially designed for use in connection with a solid end gate.

Referring now more particularly to the drawings, I have shown my improved end gate fastener in connection with an end gate which is formed of hingedly connected sections 10 and 11 mounted to swing outwardly at their meeting ends. The end gate is adapted to close the outer end of a wagon body conventionally shown at 12 and the sides of which are provided with oppositely disposed eye bolts or other similar form of fastening devices 13 arranged adjacent the rear ends of the said sides and projecting inwardly toward each other.

Mounted upon the upper margin of the section 10 of the end gate adjacent the inner end thereof, is a substantially U-shaped locking lever 14, the sides of which are formed at their extremities with oppositely directed laterally extending terminals 15 and 16 respectively. The terminal 15 is formed with a transversely extending head 17 which pivotally supports the lever upon the section 10 by a bolt or other suitable pivot pin 18.

Swingingly connected to the head 17 of the locking lever are rods 19 and 20 respectively, the outer extremities of which terminate in hooks 21 adapted to engage the eye bolts 13. The inner extremities of the said rods are reversely curved and are secured in overlapping relation to opposite ends of the head 17 at points upon opposite sides of a diametric line passing longitudinally through the head and intersecting the pivot 18. Arranged to coöperate with the lever 14 is a stop 22 secured to the inner extremity of the section 11 of the end gate and adapted to engage over the bight portion of the locking lever in the manner most clearly shown in Fig. 2 of the drawings. It is now to be observed that the rod 20 is formed of hingedly connected sections, the joint between the said sections occurring at the point where the rod normally overlies the joint between the sections 10 and 11 of the end gate. Freely supporting the outer extremities of the rods 19 and 20 are substantially U-shaped keepers 23, the outer ends of the rods being adapted for movement within the said keepers to disengage the hooks 21 thereof from the eye bolts 13.

In mounting the end gate between the sides of the wagon body 12, the outer ends of the sections thereof are moved toward the cleats 24 carried by the sides of the wagon body. The said sections are then swung upon each other to occupy a position extending in alinement between the said sides. The lever 14 is then swung upon its pivot to the relative position shown in Fig. 3 and the lugs 21 of the rods 19 and 20 are engaged with the eye bolts 13. The locking lever 14 is then swung to the position shown in Fig. 1 with the bight portion of the said lever overlying the joint between the meeting edges of the sections 10 and 11 of the end gate and engaged with the stop 22. It is to be observed that when the locking lever is moved to engage the stop 22, the inner terminals of the rods 19 and 20 will be swung in opposite directions to draw the sides of the wagon body tightly against the ends of the end gate and in the normal position of the said locking lever, the points of connection between the rods 19 and 20 and the head 17 of the said lever will be so disposed relative to the pivot of the locking lever, that the tension upon the said rods will tend to move the bight portion of the locking lever into engagement with the stop 22 for securely holding the end gate in position.

Attention is now particularly directed to the fact that the locking lever 14 when engaged with the stop 22 will coact with the sections 10 and 11 of the end gate for holding the said sections in alinement. The terminals 15 and 16 of the said lever will bear against the inner extremity of the section 10 upon one side of the joint between the sections, while the bight portion of the said lever will bear against the inner extremity of the section 11 upon the opposite side of the said joint, so that the inner extremities of the said sections will be prevented from swinging outwardly under the weight of a load. In this connection, attention is further directed to the fact that pressure upon the sides of the wagon body tending to free the end gate will operate upon the rods 19 and 20 to urge the locking lever 14 correspondingly into more secure engagement with the stop 22. To remove the end gate, the locking lever 16 is swung upon its pivot out of engagement with the said stop when the rods 19 and 20 may be disengaged from the eye bolts 13 and the inner extremities of the sections 10 and 11 swung outwardly from between the sides of the wagon body, the sections of the rod 20 pivoting upon each other to permit such swinging movement of the sections of the end gate.

In Fig. 4 of the drawings, I have illustrated a slight modification of my invention more particularly designed for use in connection with solid end gates. The end gate is shown at 25 and pivotally connected thereto at a point substantially midway its ends, is a locking lever 26, the shank of which is straight and is provided at its upper extremity with a head 27 and at its lower extremity with a knob 28 adapted to serve as a handle for the lever. Pivotally connected to opposite ends of the head 27, and arranged with their inner extremities in overlapping relation, are rods 29, the outer extremities of which are freely supported by keepers 30 and are provided with hooks as in the preferred form of the invention. Associated with the lever 26 is a stop 31 similar to the stop 22 previously described. It will be seen that when the lever 26 is swung upon its pivot to engage the stop 31, the inner ends of the rods 29 will be moved in opposite directions to draw the sides of the wagon body tightly against the extremities of the end gate for holding the said gate in position, the rods 29 being so connected to the said lever that tension upon the sides of the wagon tending to free the end gate will move the lever 26 into more secure engagement with the said stop. Since this modification of the invention is otherwise constructed and operated in accordance with the principles of the preferred form, a further description thereof will not be given.

Having thus described my invention, what I claim and desire to secure by Letters Patent is:

The combination with a sectional end gate, of a locking lever swingingly connected to one of said sections, a stop carried by the other section, and coacting tie rods having their inner extremities arranged in overlapping relation and respectively secured to the said lever at points spaced above and below the pivotal axis thereof with the said rods adapted to urge the lever to swing in a plane with the said rods to a position overlying the joint between the sections in engagement with said stop for holding the inner ends of the sections against relative movement.

In testimony whereof, I affix my signature.

ROBERT P. KRUSE. [L. S.]